March 12, 1929. P. K. WESTCOTT 1,705,432
AIRPLANE LANDING APPARATUS
Filed Feb. 21, 1925   2 Sheets-Sheet 1
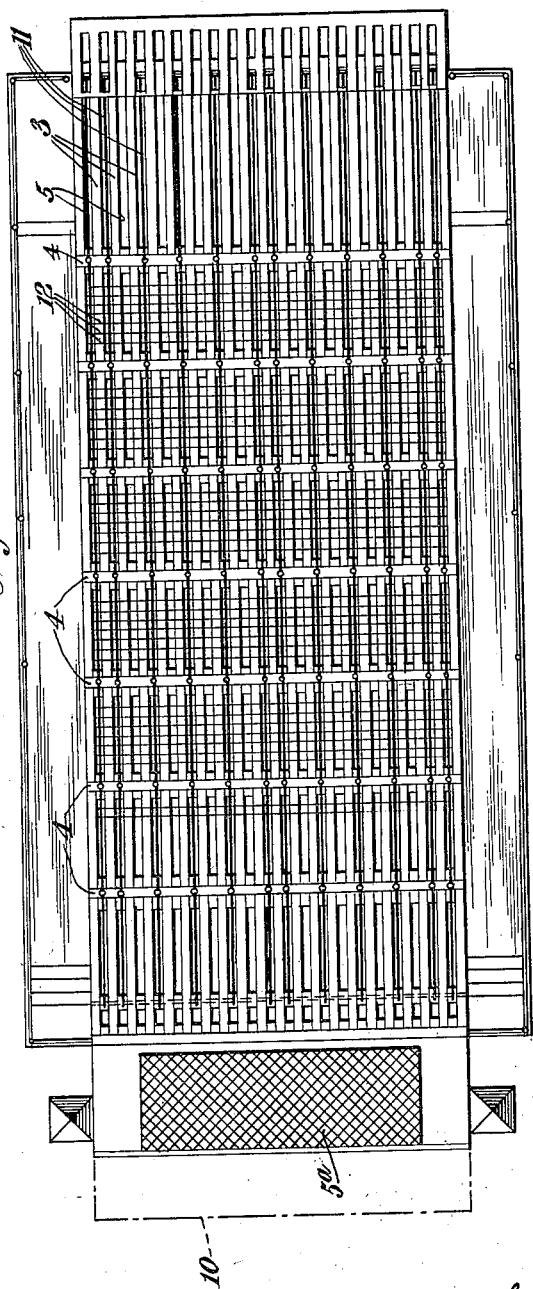
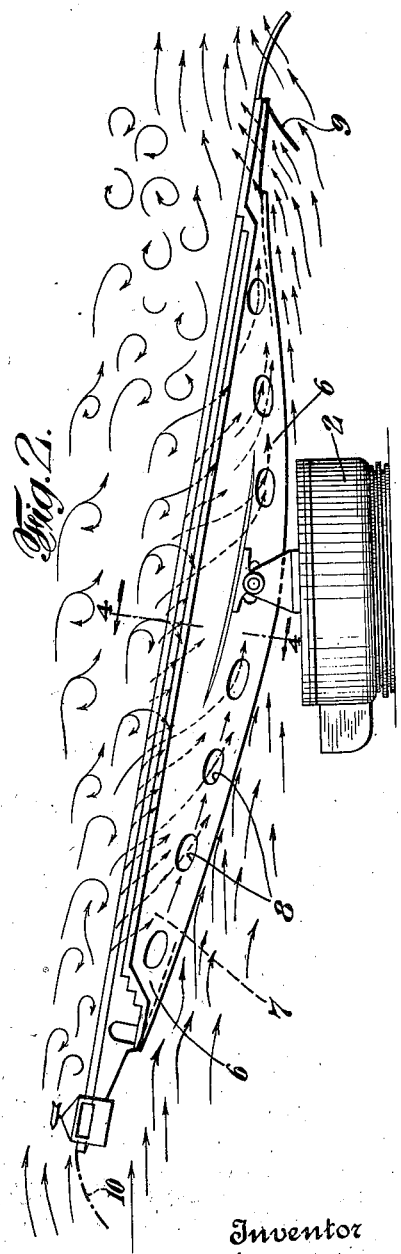
Inventor
Pliny K. Westcott
By his Attorneys
Prindle, Wright Neal & Bean March 12, 1929. P. K. WESTCOTT 1,705,432
AIRPLANE LANDING APPARATUS
Filed Feb. 21, 1925 2 Sheets-Sheet 2
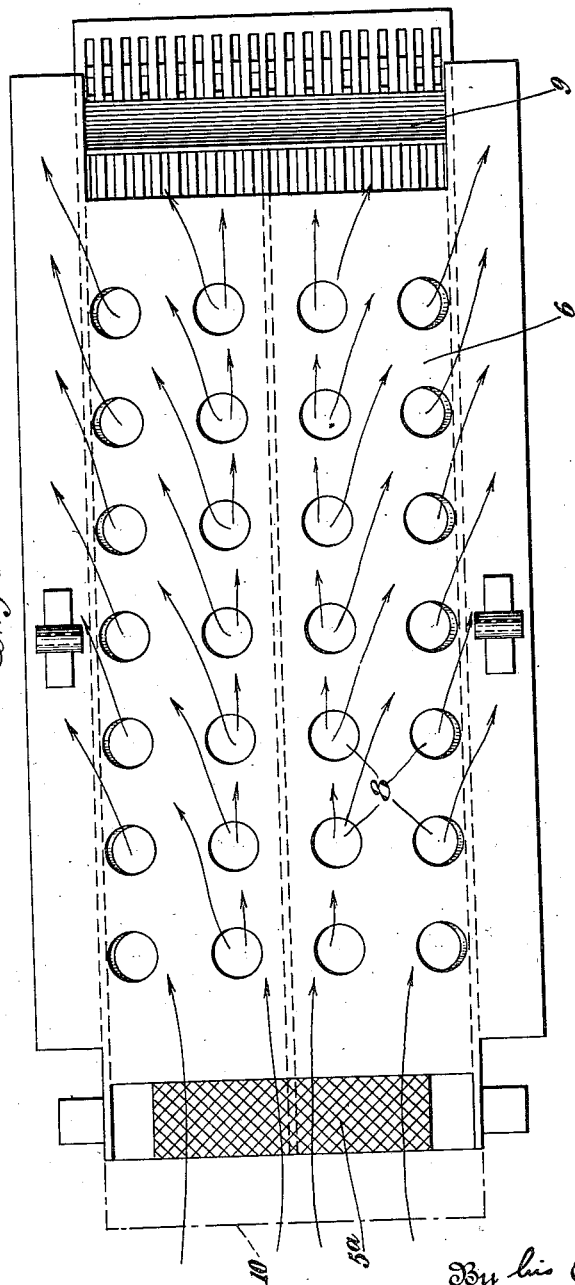
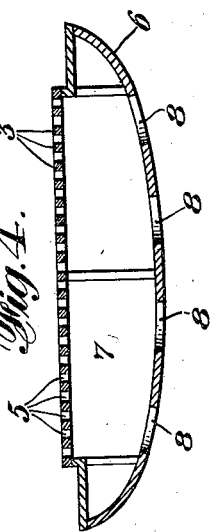

Patented Mar. 12, 1929.

1,705,432

UNITED STATES PATENT OFFICE.

PLINY KILBURN WESTCOTT, OF BROOKLYN, NEW YORK, ASSIGNOR TO MARY A. KENNEY, OF BROOKLYN, NEW YORK.

AIRPLANE LANDING APPARATUS.

Application filed February 21, 1925. Serial No. 10,723.

The invention relates to an apparatus of the above nature having a platform or runway along which an airplane travels in landing or launching and has for its primary object to provide a construction in the use of which air conditions will be created above and around the platform which will promote the safe landing of airplanes thereon.

In accordance with the invention the natural air currents or wind to which the apparatus will be subjected in use, are so controlled in moving past the apparatus as to produce a rarefication of the air immediately above the runway, thereby decreasing the lift on the machine as it nears the runway and enabling it to drop on the runway in a comparatively short period of time. Further objects and advantages of the invention will be in part obvious and in part specifically pointed out in the description hereinafter contained which taken in connection with the accompanying drawings, discloses a preferred embodiment thereof; such embodiment, however, is to be considered as merely illustrative of its principles. In the drawings—

Fig. 1 is a plan view and Fig. 2 a side view of an apparatus constructed in accordance with the invention.

Fig. 3 is a bottom view of the same apparatus with its turret-like support removed, and Fig. 4 is a transverse section on line 4—4 of Fig. 2 looking in the direction of the arrows.

The invention is illustrated as applied to a landing apparatus having a platform 1 pivoted to swing in a vertical plane upon a turret-like support 2, for example, of the construction shown in the patent to Richard Gibbons Reissue No. 15,758, dated February 12, 1924, entitled "Airplane receiving apparatus". Thus the platform as a whole may be moved angularly about a vertical axis to position the platform 1 parallel to the wind and the platform may also be tilted to different angles to enable an airplane to be landed against the wind and up an incline, as will usually be desirable.

The platform 1 is of honycombed or gridlike construction, being provided with a large number of openings in its active surface, to enable air to pass therethrough substantially uniformly throughout the entire active area thereof. In the present instance the active surface of the platform is made up of a series of spaced longitudinal slats 3 which rest upon cross members 4, thus providing openings 5 between the slats and through which air may pass. At its far end the platform 1 may be provided with a net 5ª on to which the airplane will pass in case its speed is not sooner checked. The platform may be strengthened by suitable beams of standard structural shape which need not be described in detail, and the space directly beneath the openings 5 is enclosed by a baffle member or housing 6 to form an air chamber 7 therein.

If desired, suitable longitudinal guide cables 11 may be strung above the platform 1 to maintain the airplane in alinement therewith, and such platform may also be provided with transverse speed-retarding members 12 which, however, will not be described in detail herein, as they form no part of the present invention.

In the use of the apparatus, the platform will be positioned parallel to the direction of the wind with its entrance end depressed. As shown in Fig. 2 the housing 6 is preferably somewhat bulged at the center of the platform and the air currents striking the platform follow the arrows indicated in Fig. 2; that is to say, the currents of air striking the lower side of the elevated far end of the platform are deflected by the housing 6 to follow a path substantially parallel to the surface of the housing while the air currents which pass above the upper edge of the platform tend to rarefy the air immediately above the platform. A number of openings 8 are provided in the housing 6 and the air which travels along the under surface of the platform as above described, creates a certain amount of suction or reduced pressure in chamber 7, which reduced pressure in turn causes the air immediately above the platform to form a number of individual whirls or eddies as indicated in Fig. 2, and causes the currents of air to pass downwardly through the openings 5 and out of chamber 7 through the openings 8 therein. The currents of air above mentioned will be particularly augmented beyond the bulged central portion of the housing 6, the arrows in Fig. 2 indicating the course of the air currents at different points fairly accurately.

Preferably a deflector member 9 is provided underneath the entrance end of the platform and the openings 5, and the chamber 7 is terminated somewhat ahead of the deflector in order that a certain portion of the air currents flowing along the under surface of the housing 6 may be deflected upwardly through the openings 5 which are immediately ahead of deflector 9. As is also indicated in Fig. 2, this deflector member thus serves to equalize the air conditions directly beyond the entrance end of the platform in order that the airplane will not be subjected to undue disturbances before it reaches the platform.

The housing or baffle member 6 is also preferably of convex cross section as appears most clearly in Fig. 4, in order that the air currents which pass along the under side of this housing will be deflected laterally to a certain extent as indicated in Fig. 3.

The above apparatus under suitable wind conditions, will produce a sufficient decrease in the lift upon an airplane as the latter passes over the platform to assist materially in landing. If desired, suitable means (not illustrated) may be employed in the air chamber 7 to increase the downward flow of air therethrough.

If desired, an adjustable deflector 10 may also be positioned at the upper end of the platform to distribute the wind currents between the upper and lower sides of the platform. With the deflector 10 depressed more air will tend to travel above the platform and such currents of air will be deflected upwardly to a greater extent, thus producing a rarefied condition at a greater height above the platform.

While a specific embodiment of the invention has been described, it will be obvious that many changes may be made therein without departing from the principle of the invention, as defined in the following claims.

I claim:

1. An airplane landing apparatus, comprising a platform honeycombed to permit air to pass substantially uniformly through different areas thereof, and means beneath said platform for utilizing natural wind currents to produce a downward draft of air through said platform.

2. An airplane landing apparatus, comprising a platform honeycombed to permit air to pass substantially uniformly through different areas thereof, and means beneath said platform for utilizing natural wind currents to rarefy the air immediately above said platform.

3. An airplane landing apparatus, comprising a platform honeycombed to permit air to pass substantially uniformly through different areas thereof, a baffle member underlying said platform and having openings in communication with the platform openings, said baffle member being shaped to cause air currents to pass downwardly through said openings upon being subjected to wind currents.

4. An airplane landing apparatus, comprising a platform honeycombed to permit air to pass substantially uniformly through different areas thereof, a baffle member underlying said platform and providing a chamber beneath the platform, said baffle member being longitudinally convexed and having openings leading from said chamber.

5. An airplane landing apparatus, comprising a platform honeycombed to permit air to pass substantially uniformly through different areas thereof, a baffle member underlying said platform and providing a chamber beneath the platform, said baffle member being of convex cross section and having openings leading from said chamber.

6. An airplane landing apparatus, comprising a platform honeycombed to permit air to pass substantially uniformly through different areas thereof, a baffle member underlying said platform and providing a chamber beneath the platform, said baffle member being longitudinally convexed and being also of convex cross section and having openings leading from said chamber.

7. An airplane landing apparatus, comprising a platform inclined upwardly toward its far end, and means for causing a current of air to pass upwardly in the region of the lower entrance end of the platform, said means comprising a deflector member disposed at the entrance end of the runway.

8. An airplane landing apparatus, comprising an inclined platform honeycombed to permit air to pass substantially uniformly through different areas thereof, a baffle member underlying said platform and having openings in communication with the platform openings, said baffle member being shaped to cause air currents to pass downwardly through said openings upon being subjected to wind currents and a deflector member disposed at the upper end of the platform.

In testimony that I claim the foregoing, I have hereunto set my hand this 17th day of February, 1925.

PLINY KILBURN WESTCOTT.